United States Patent
Berger et al.

(10) Patent No.: US 8,520,551 B2
(45) Date of Patent: Aug. 27, 2013

(54) DEVICE AND METHOD FOR CLUSTERING A PLURALITY OF USERS IN A MOBILE NETWORK

(75) Inventors: Michael Berger, Höhenkirchen (DE); Christian Seitz, München (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1954 days.

(21) Appl. No.: 10/569,493

(22) PCT Filed: Aug. 20, 2004

(86) PCT No.: PCT/EP2004/051870
§ 371 (c)(1),
(2), (4) Date: Feb. 27, 2006

(87) PCT Pub. No.: WO2005/022868
PCT Pub. Date: Mar. 10, 2005

(65) Prior Publication Data
US 2007/0008905 A1   Jan. 11, 2007

(30) Foreign Application Priority Data
Aug. 25, 2003 (DE) ................. 103 39 035

(51) Int. Cl.
*H04L 12/28* (2006.01)
(52) U.S. Cl.
USPC ........... 370/254; 370/328; 370/329; 370/338; 455/41.2; 455/414.1; 455/414.2; 455/518; 455/519

(58) Field of Classification Search
USPC ...... 370/328, 254, 400, 329, 338; 455/414.1, 455/414.2, 41.2, 518, 519
See application file for complete search history.

(56) References Cited

U.S. PATENT DOCUMENTS

| | | | |
|---|---|---|---|
| 6,549,768 B1 * | 4/2003 | Fraccaroli | 455/456.3 |
| 6,795,421 B1 * | 9/2004 | Heinonen et al. | 370/338 |
| 7,102,640 B1 * | 9/2006 | Aholainen et al. | 345/440 |
| 7,249,182 B1 * | 7/2007 | Heinonen et al. | 709/227 |
| 2002/0119770 A1 * | 8/2002 | Twitchell, Jr. | 455/422 |
| 2002/0168938 A1 * | 11/2002 | Chang | 455/41 |

FOREIGN PATENT DOCUMENTS

| | | |
|---|---|---|
| DE | 19855142 C1 | 5/2000 |
| WO | WO 03/055149 A1 | 7/2003 |

OTHER PUBLICATIONS

Chen Geng; Stojmenovic Ivan, "Clustering and Routing in Mobile Wireless Networks" und, Technical Report TR-9,9-05, School of Information Technology & Engineering, University of Ottawa, Canada, Jun. 1999.

Fasulo Daniel ,"An Analysis of Recent Work on Clustering Algorithms", Technical Report UW-CSE-01-03-02, Computer Sciences Department, Washington University, Apr. 26, 1999.

(Continued)

*Primary Examiner* — Olumide T Ajibade Akonai
(74) *Attorney, Agent, or Firm* — Staas & Halsey LLP

(57) ABSTRACT

A method clusters a plurality of users in a mobile network, according to a specific profile. Data regarding the user is allocated to each user. Data is immediately exchanged between at least two users as soon as said users are located in a predefined communication range in order to spot users with profiles having a given content.

26 Claims, 2 Drawing Sheets

(56) References Cited

OTHER PUBLICATIONS

Tseng, Y-C et al., Location Awareness in Ad Hoc Wireless Mobile Networks, Computer, IEEE Computer Society, Long Beach, CA, US, vol. 34, Nr. 6, Jun. 2001, pp. 46-52, XP001103949.

Fabian Garcia Nocetti, Julio Solano Gonzales; Ivan Stojmenovic; Connectivity Based k-Hop Clustering in Wireless Networks, Telecommunications Systems,—online—May 2003, pp. 205-220, XP002311117 http://www.site.uottawa.ca/{ivan/GSS-TS.pdf>.

Yuanzhu Peter Chen, Arthur L. Liestman, "A Zonal Algorithm for Clustering Ad Hoc Networks", International Journal of Foundations of Computer Science,—online—Apr. 2003, pp. 1-18, XP002311118 <http://citeseer. ist.psu.edu/cache/papers/cs/27797/ht- tp:zSzzSzwww.cs.sfu.scazSz{yzchenzSzpersonalzSz. zSzpaperszSzijfcs03.pdf/chen03zonal.pdf>.

Chang Wook Ahn et al., "Efficient clustering-based routing protocol in mobile ad-hoc networks", VTC 2002-FALL. 2002 IEEE 56$^{th}$. Vehicular Technology Conference Proceedings. Vancouver, Canada, Sep. 24-28, 2002, IEEE Vehicular Technology Conference, New York, NY, vol. 1 of 4, Conf. 56, Sep. 24, 2002, pp. 1647-1648, XP010608708.

Altrock, C.v.: Über den Daumen gepeilt; Fuzzy Logic: scharfe Theorie der unscharfen Mengen. Zeitschrift c't, Jahrgang 1991, vol. 3, Heise Verlag, Hannover, 1991, pp. 188-206.

El-Sonbaty, Y; Ismail, M.A., Fuzzy Clustering for Symbolic Data. IEEE Transactions on Fuzzy Systems, vol. 6, No. 2, May 1988, pp. 195-204.

\* cited by examiner

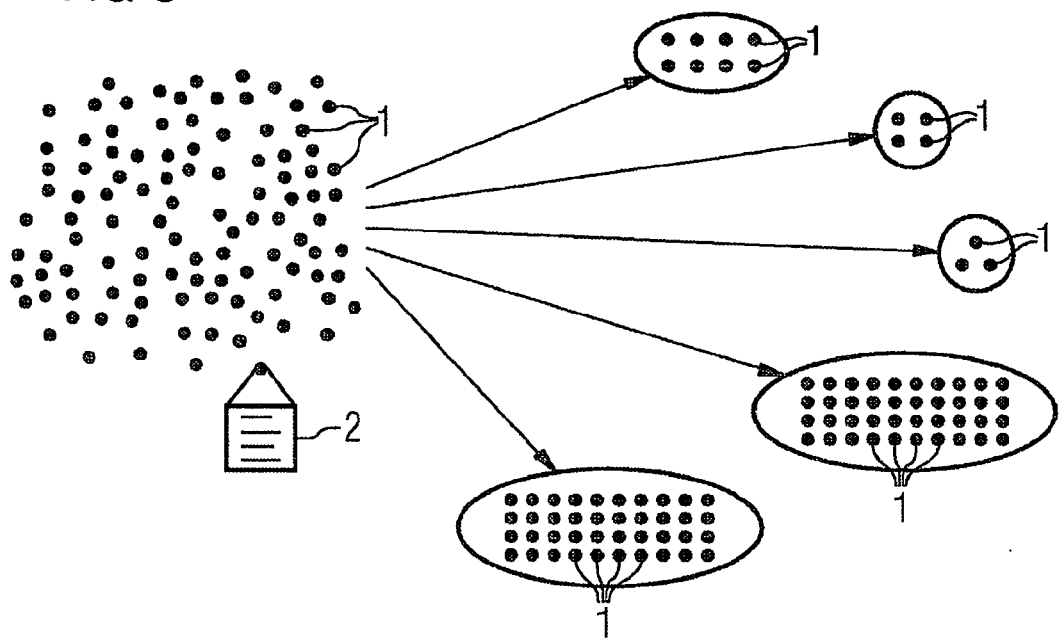

DEVICE AND METHOD FOR CLUSTERING A PLURALITY OF USERS IN A MOBILE NETWORK

CROSS REFERENCE TO RELATED APPLICATIONS

This application is based on and hereby claims priority to PCT Application No. PCT/EP2004/051870 filed on Aug. 20, 2004 and German Application 10339035.9 filed on Aug. 25, 2003, the contents of which are hereby incorporated by reference.

BACKGROUND OF THE INVENTION

The application relates to a method for clustering a plurality of users in a mobile network, wherein a specific profile containing data about the user is assigned to each user. The application additionally relates to a device for clustering a plurality of users in mobile networks. The application further relates to a corresponding computer program with program code and a corresponding computer program product for clustering a plurality of users in a mobile network.

The user can be, for example, a person equipped with a terminal such as a mobile telephone, pocket PC (PDA), tablet PC or similar, or can be a vehicle such as a rail-borne cabin-type vehicle.

The profile assigned to each user contains data concerning said user. This can be personal and/or business data, address data, interests of a person or similar. A profile can also contain "want" data or "offer" data. "Want" data includes, for example, data regarding items or services requested by the user. Correspondingly, "offer" data is data concerning an item or service which the user is offering for sale, rent or loan. Profile data can also contain information as to which destination a user wishes to reach at what time and by which means of transportation.

From the related art, there are two known approaches for clustering a plurality of users, i.e. forming (virtual) groups of associated objects.

In "Clustering and Routing in Mobile Wireless Networks" by Geng Chen and Ivan Stojmenovic, Technical Report TR-9, 9-05, School of Information Technology & Engineering, University of Ottawa, Canada, June 1999, there is described a method for clustering users in the mobile environment. According to this method, a group of mobile users, specifically terminals, is formed or clustered in respect of their geographical data or position.

In the publication "An Analysis of Recent Work on Clustering Algorithms" by Daniel Fasulo, Technical Report UW-CSE-01-03-02, Computer Sciences Department, Washington University, 26 Apr. 1999, there is described a method whereby similar data records are picked out from a plethora of data.

Both methods are incapable of clustering a plurality of users in a mobile ad hoc network if a specific profile containing data about the user is assigned to each user.

WO 03/055149 A1 discloses a method for mobile ad hoc networks wherein mobile terminals are clustered as a function of attributes which the mobile terminals have in common. However, this method is insufficiently flexible for many applications.

SUMMARY OF THE INVENTION

One possible object of the present invention is to specify a method which allows the flexible clustering of a plurality of users in a mobile ad hoc network, the users being clustered according to their specific profiles.

The inventors propose a method for clustering a plurality of users in a mobile network, wherein a specific profile containing data about the user and at least one constraint is assigned to each user, it is provided that a direct data exchange takes place between at least two users, as soon as said users are in a specified communication zone, in order to find users with profiles of a specified content in the specified communication zone taking the constraints into account.

Each user possesses a profile containing characteristics of said user. This profile constitutes the basis for subdividing (clustering) the users into groups (clusters), cluster members having similar profiles.

The aim is therefore to seek out these similar profiles in a mobile ad hoc environment. This can be implemented, for example, by the distance function or generally with a function.

The advantage of the method is that it operates on a completely decentralized basis, i.e. no central database is required. Communication between the users is therefore conducted without the interposition of a central switching entity. Communication between two users takes place locally, which means that only users within a particular communication radius are able to intercommunicate.

In order to enable not merely a comparison by identicalness to be performed, the at least one constraint is taken into account as part of the analysis. This information can be acquired using a similarity function and processed, thereby considerably increasing the probability of a plurality of users with similar profiles being found within a user cluster.

The computer program with program code is set up to carry out all the steps according to the method when the program is run on a computer.

The computer program product with the program code stored on a machine-readable media is set up to carry out all the steps according to the method when the program is run on a computer.

The device and the computer program with program code, set up to carry out all the steps according to the method when the program is run on a computer, as well as the computer program product with program code stored on a machine-readable media, set up to carry out all the steps according to the method when the program is run on a computer, are particularly suitable for carrying out the method or one of its further developments explained below.

The further developments described below relate both to the method and to the arrangement.

Moreover, the system can be realized by a computer readable storage medium on which is stored the computer program with program code which implements the method.

The system can also be realized by a computer program product which has a storage medium on which is stored the computer program with program code which implements the method.

The communication zone is defined in a further development by the formation of at least one user cluster having in each case an initiator user and a plurality of other users. This procedure is useful particularly when a very large number of users are to be clustered. The purpose of this procedure is to limit the number of conceivable communicating parties to a particular number. As the users intercommunicate directly, i.e. without going through a central switching entity, the locating of users with profiles of a specifiable content in the communication zone must also be performed by the users themselves. If there are too many users in the communication zone, the timing and computing complexity would possibly be too great.

The user cluster has an extent which is equal to or greater than the communication range of an individual user. This means that the communication zone encompasses an area or a volume extending beyond the communication range of an individual user.

According to an advantageous embodiment, a communication topology, i.e. the possible communication paths between the users within the specified communication zone, is formed at the instigation of the initiator user within each user cluster. Although an initiator user does not differ fundamentally from the other users in the user cluster, he is the only member of a user cluster permitted to send the first communication within the user cluster. This procedure is useful in order to prevent the scenario of all the users beginning to initiate a communication between the users simultaneously and/or in an uncoordinated manner.

An initiator user can be selected on the basis of an active selection algorithm or on the basis of a passive determination method, the use of a passive determination method being the simpler procedure. Here each user is assigned an identification number (ID). The initiator user of a user cluster is, for example, the user having the highest ID within said user cluster.

It has been found advantageous for the communication topology to be implemented as a tree structure, so-called "spanning tree", or as a ring structure. Other topologies are of course basically possible, the selection of a topology depending essentially on the degree of mobility of the users. An ad hoc network is basically modeled as an undirected graph. In this graph the users are represented by so-called nodes. A link exists between the nodes if the distance between two nodes is less than the communication radius of one of the users. Graph theory guarantees that a structure, e.g. a tree structure, exists for each graph.

It is advantageous if the communication path is via a specified maximum number of users in accordance with the specified communication topology. In this way it can be ensured that the communication zone resulting from the formation of at least one user cluster is limited in respect of its extent and therefore of its users.

In a further advantageous embodiment of the method, each user is assigned to a single user cluster. During the formation of the user clusters it is possible that individual users or a plurality of users would initially be assignable to a plurality of user clusters. The areas or volumes assumed by the user clusters may therefore overlap, in which case the users in question are located within the intersecting regions of these areas or volumes. Preferably each user decides autonomously to which user cluster he belongs. The decision as to which user cluster a user wishes to join could be made e.g. on the basis of his profile and the profiles of the adjacent users in particular user clusters.

The user cluster is preferably redefined whenever another user not hitherto belonging to the user cluster is identified within the particular communication zone. In this way the user dynamics in an ad hoc network can be taken into account.

In order now to look for similar profiles, the search can be confined to the profiles of users within a particular user cluster. However, it should be noted at this point that the defining of the user clusters and the associated delimiting of a communication zone merely serves the purpose of reducing the computing workload of the relevant users. Provided the users have a sufficiently powerful computing unit, it is in some cases unnecessary to define a limited user cluster in respect of its number of users.

The checking of profiles of a specified content includes analyzing the profiles of at least two users for similarity or identicalness, the idea of local communication among the users becoming apparent. Profiles are not exchanged subject to the interposition of a switching entity which possibly also performs a comparison; instead, neighboring users or users adjacent in the communication path exchange their profile data and perform a comparison of this data in each case.

Advantageously, each user self-defines at least part of his profile and the at least one constraint.

The profile groups of the user within a cluster are then exchanged between the users for analysis. As already described, the data is exchanged directly between users.

The data is preferably exchanged using the communication topology determined. The profile groups are analyzed, as already described, by each user. The analysis itself is therefore a successive process, as data is also exchanged successively between users.

As soon as a user has detected similarity with another user, the user is informed of the other users with profiles of the specified content. This information can be displayed or audibly communicated, e.g. by a voice message, on a terminal.

The device for clustering a plurality of users in mobile networks, each user being assigned a specific profile containing profile data, is designed such that an exchange of data between at least two users takes place as soon as said users are in a specified communication zone in order to find users with profiles of a specified content in said specified communication zone. The device is ultimately a terminal such as a mobile telephone, a pocket PC, a portable computer or a means of transportation such as an automobile, a cabin-type vehicle or a rail vehicle, which is capable of communicating peer-to-peer.

The device preferably has an interface for wireless data transfer, e.g. by Wireless LAN (WLAN) or Bluetooth. Each user has a computing unit for comparing his own profile or profile group with the profile or profile group of another user. The device is implemented in such a way that direct data interchange (peer-to-peer) between two users is possible.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 3 schematically illustrates the method for clustering a plurality of users in a mobile ad hoc network.

DETAILED DESCRIPTION OF THE PREFERRED EMBODIMENT

Figure 1:
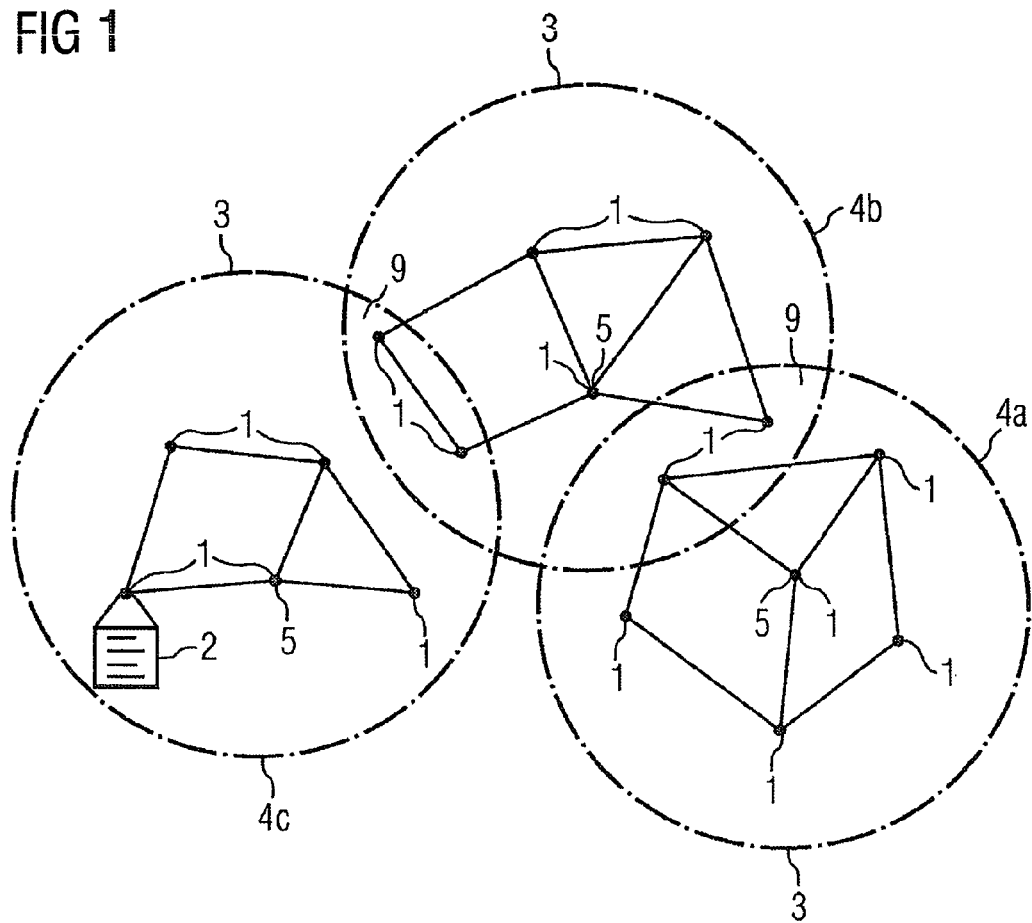
FIG. 1 shows a plurality of users and their assignment to a cluster.

Reference will now be made in detail to the preferred embodiments of the present invention, examples of which are illustrated in the accompanying drawings, wherein like reference numerals refer to like elements throughout.

FIG. 1 schematically illustrates the method according to the one embodiment of the invention for clustering a plurality of users 1. All the users 1 are in a highly frequented location such as a sports stadium or marketplace. Each user has a terminal via which he can exchange and receive data. The terminal can be a mobile telephone, for example. In order to facilitate the clustering of the plurality of users 1, the totality of the users 1 is subdivided into so-called user clusters 4. FIG. 1 shows a total of three clusters 4 (4a, 4b, 4c). The clustering effectively serves to reduce—within a user cluster—the number of communicating parties.

For this purpose, an initiator user 5 is first determined within each user cluster. The initiator user within a user cluster 4 is e.g. the user having the highest identification number (ID) within said user cluster 4. The initiator user 5 begins to set up a communication with the adjacent users 1 within the user cluster 4.

The initiator user is not absolutely necessary for implementing the method. This is useful particularly when clustering of a large number of users is initiated simultaneously. In the event that a cluster is formed by people successively entering (and also of course leaving) a communication zone, the initiator user is unnecessary.

Figure 2:
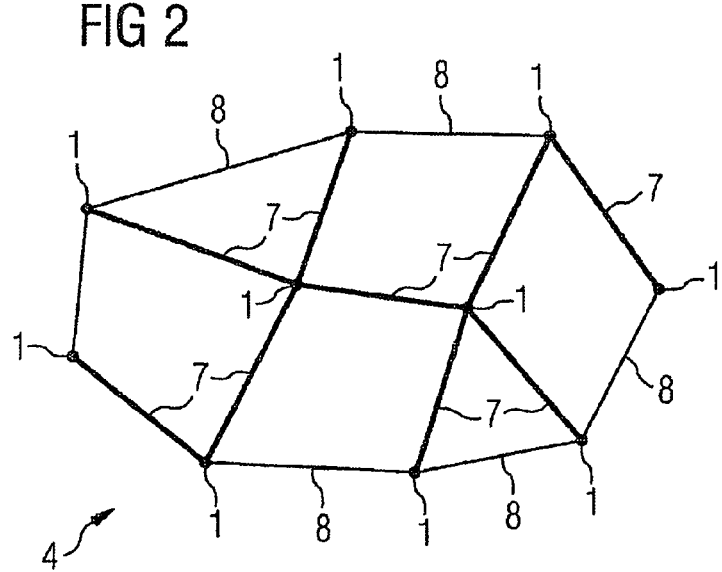
FIG. 2 depicts the users in a graph and possible tree structure.

Communication preferably takes place via a communication path or a communication topology. For this purpose a graph model is employed according to which communication between two users is possible if the distance between them is less than the communication range of a user. A typical graph with possible communication paths 8 and actual communication paths 7 is shown in FIG. 2. The extent of a user cluster and therefore of the communication zone 3 is determined by defining the maximum number of users via which communication can take place. The higher this number, the farther the communication zones 3 extend, i.e. the more potential users a cluster 4 can contain.

FIG. 1 now also shows that communication zones 3 may overlap. The intersecting regions of two communication zones are identified by the reference numeral 9. Users 1 may also come to be in an intersecting region 9 of this kind. They could therefore belong to the communication zones 3 defining the intersecting region 9. However, for the implementation of the method, it is necessary for each user 1 to belong to a single user cluster 4. The decision as to which user cluster 4 a user 1 belongs shall be made autonomously by said user. This can take place, for example, on the basis of a comparison of his profile with the profiles of the adjacent users with which direct communication is possible. By this preselection, which is effected by direct communication between the users, those which are located in an intersecting region 9 can define membership of a user cluster.

In order now to find users with similar profiles which are present e.g. in the form of functions, only the users 1 within a user cluster 4 continue to be considered. FIG. 1 shows a total of three user clusters 4a, 4b, 4c. The process described below is therefore carried out within the now finally defined user clusters 4a, 4b, 4c.

In order to find users with similar profiles, two steps are performed. In the first step, each user defines for himself which constraint or constraints must be taken into account in addition to his profile. In the second step, the profiles are exchanged between members of a user cluster 4. The profile of a user is therefore successively combined with profiles of the other users. This process is performed separately at each user or in each terminal of a user in order to ensure that all users have the same information at the end of this process. The result of the comparison can finally be audibly or visually communicated.

The method lends itself particularly to a scenario in which passengers in the public transportation system are to be clustered in respect of their destination. The public transportation system in built-up areas is bound by a fixed timetable and rigidly specified route network. This means that means of transportation such as buses travel over a generally unchangeable route at fixed times. In the latter case, the passenger has no possibility of influencing the departure times or the route of the means of transportation.

Particularly in thinly populated areas or during the night, many transportation companies offer so-called dial-a-bus or dial-a-taxi services. To use them, the passenger must apply in good time (approximately 1 hour before departure) to a central office, e.g. a telephone exchange or a database connected to the Internet.

However, this transportation on-demand system is not automatically possible at highly frequented locations such as a sports stadium. The method now enables passengers to be clustered according to their destination and travel time. This is made possible by the fact that each potential passenger is equipped with a mobile terminal such as a mobile telephone, a pocket PC or a mobile computer. This passenger/mobile terminal entity corresponds to the user mentioned at the outset. Each of the mobile terminals is provided with an interface (e.g. WLAN or Bluetooth) in order to allow direct communication with other terminals.

FIG. 3 shows a plurality of such users 1, each equipped with a terminal containing a profile 2. In addition to data about the passenger, such as the passenger's place of residence, further entries about the passenger are present there which contain information about the passenger's travel pattern and preferred means of transportation. This information indicates, for example, when the person wishes to travel where and by which preferred means of transportation.

At highly frequented locations such as sports stadia, marketplaces or beer gardens, it is possible, using the mobile terminal, to cluster people on the basis of the profile stored on their terminal. In the present example, a cluster is characterized by the desire to use a common means of transportation at the same time and to approximately the same destination.

In FIG. 3, for example, five clusters are formed of which the first cluster (top), containing a total of eight users 1, uses e.g. a large taxi at time X1 to travel to location Y1. Another cluster (second from top,) having four users 1, uses a taxi at time X2 to travel to location Y2. In a corresponding manner, further clusters whose users 1 share the same destination have found one another.

As the relevant clusters spontaneously find one another, there is no need for a fixed time schedule. This is possible due to the fact that the users' profiles contain information about the preferred departure time. After clustering, appropriate means of transportation are ordered depending on the size of the cluster. Stops can now be defined dynamically according to the passengers' wishes.

The fact that different passengers are clustered together does not necessarily mean that they have identical destinations. As each user's terminal also contains, in addition to the user's exact profile, constraints which the user regards as similar (e.g. supplemental or limiting) to the user's basic profile, users or passengers having a similar destination, e.g. located along a route, will find themselves within a cluster.

For example, the user can specify as a constraint that the user is prepared to make a detour of up to 10 km, that the user is prepared to defray extra costs of up to 15%, or that the user can accept an extra journey time of up to 20 minutes. These criteria are subsequently taken into account for clustering.

Introducing the above-described method has advantages both for the passenger and for the operator of the means of transportation. Because of profile-based determination, the passengers are transported more quickly and on a more demand-driven basis to their desired destination. Selective finding of clusters for the means of transportation additionally reduces the waiting time for the passengers of said means of transportation. Using the local communication interface incurs no additional costs for the user. On the part of the operators of the means of transportation, implementation of the above system makes savings possible. For example, the means of transportation can be sized according to demand, resulting in improved capacity utilization. On the other hand, operating costs such as fuel costs can be reduced through route optimization. Lastly, the means of transportation is ready more quickly for redeployment.

The method can likewise be used for clustering museum visitors for the purpose of an optimum composition of a group for a museum tour. In museums, castles or other cultural institutions, guided tours are offered in which a qualified person relates the background of the items on display. However, these explanations are not geared to a particular audience, or only to a limited extent. By the profile-based clustering of users, likewise represented by a person with a mobile terminal, it is possible to cluster museum visitors e.g. according to their interests and thus tailor guided tours more precisely to user requirements, thereby enabling the quality of the guided tours to be improved.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for clustering a plurality of users in a mobile network, comprising: assigning each user a specific profile containing data about said user and at least one constraint; performing a direct data interchange between at least two users as soon as they are in a specified communication zone; and clustering users within the same communication zone, based on the data and constraints of their profiles, each cluster having an initiator and one or more other users, the initiator being the only user in each cluster that is permitted to send the first communication within the respective user cluster; wherein the initiator is selected by an active selection algorithm or a passive selection algorithm.

2. The method according to claim 1,
wherein a user cluster has a size that is equal to or larger than a communication range of an individual user.

3. The method according to claim 1,
wherein for each cluster, the initiator user causes a communication topology to be formed.

4. The method according to claim 3,
wherein the communication topology is formed as a tree or ring structure.

5. The method according to claim 1, wherein
individual users are connected through a communication path that involves passing a signal through intermediate users, and
the communication path is defined to have a maximum number of intermediate users.

6. The method according to claim 1, wherein each user is assigned to a single cluster.

7. The method according to claim 6,
wherein each user decides autonomously to which cluster he belongs.

8. The method according to claim 1,
wherein the user cluster is redefined if a new user not hitherto belonging to the cluster is identified within the particular communication zone and the new user has a profile relevant to the user cluster.

9. The method according to claim 1,
wherein users with similar profiles are grouped in the same cluster.

10. The method according to claim 1,
wherein each user defines his profile and the at least one constraint, and
the constraint specifies the type of users to which the user wants to be clustered.

11. The method according to claim 1,
wherein the profiles are exchanged for analysis between users within a cluster.

12. The method according to claim 11,
wherein the profiles are exchanged by exchanging, data user-by-user.

13. The method according to claim 11,
wherein a communication topology is defined for data exchange and the profiles are exchanged according to the communication topology.

14. The method according to claim 1,
wherein users are clustered according to a common characteristic, and
each user in the cluster is informed of the common characteristic.

15. The method according to claim 1,
wherein the users communicate without the interposition of a central switching entity.

16. The method according to claim 1, wherein
an initiator user specifies attributes of desirable users,
the initiator user is clustered with the desirable users, and
the users in the cluster are identified to one another.

17. A device for clustering a plurality of users in mobile networks, wherein each user is assigned a specific profile containing profile data and at least one constraint, data exchange taking place directly between at least two users as soon as they are in a specified communication zone in order to find users with profiles of a specified content, taking the constraints into account, in the specified communication zone, each cluster having an initiator and one or more other users, the initiator being the only user in each cluster that is permitted to send the first communication within the respective user cluster; wherein the initiator is selected by an active selection algorithm or a passive selection algorithm.

18. The device according to claim 17,
wherein the device has an interface for wireless data transfer.

19. The device according to claim 17,
wherein data is exchanged directly between two users each case.

20. The device according to claim 17,
wherein the device is a mobile telecommunication terminal, a pocket PC, a portable computer or a means of transportation.

21. The device according to claim 17,
wherein the device has a computing unit configured to compute its own profile or profile group with the profile or profile group of another user.

22. The device according to claim 17, wherein the device includes a computer program that can be run on a computer.

23. The device according to claim 22 wherein the computer program is stored on a non-transitory computer-readable data media.

24. The device according to claim 17, with the device including program coding means stored on a machine-readable media.

25. A method for clustering a plurality of users in a mobile network, comprising: specifying attributes of desirable users, the attributes being specified at an initiator mobile terminal in an ad hoc communication network; searching, by the initiator mobile terminal, for users having the attributes specified by the initiator user by performing a direct data interchange between the initiator mobile terminal and each of a plurality of users in the mobile network, the initiator mobile terminal being the only user in the ad hoc communication network that is permitted to send the first communication; clustering together users having the attributes specified by the initiator mobile terminal, to thereby form a user cluster; and providing the users of the user cluster with information regarding other users within the same cluster; wherein the initiator is selected by an active selection algorithm or a passive selection algorithm.

26. A computer readable medium storing a computer program to execute a method for clustering a plurality of users in a mobile network, the method comprising: assigning each user a specific profile containing data about said user and at least one constraint; performing a direct data interchange between at least two users as soon as they are in a specified communication zone; clustering users within the same communication zone, based on the data and constraints of their profiles, each cluster having an initiator and one or more other users, the initiator being the only user in each cluster that is permitted to send the first communication within the respective user cluster; and assigning each user a specific profile containing data about said user and at least one constraint; wherein the initiator is selected by an active selection algorithm or a passive selection algorithm.

* * * * *